(12) United States Patent  
Motomura et al.

(10) Patent No.: US 7,779,195 B2  
(45) Date of Patent: Aug. 17, 2010

(54) COMMUNICATION CONTROL APPARATUS FOR COMMON BUS CONNECTION DEVICES

(75) Inventors: Masashi Motomura, Yokohama (JP); Tetsuji Tsunekawa, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 922 days.

(21) Appl. No.: 11/449,989

(22) Filed: Jun. 9, 2006

(65) Prior Publication Data

US 2006/0294287 A1 Dec. 28, 2006

(30) Foreign Application Priority Data

Jun. 10, 2005 (JP) .............................. 2005-171358

(51) Int. Cl.
*G06F 13/36* (2006.01)
*G06F 13/20* (2006.01)
*G06F 1/00* (2006.01)

(52) U.S. Cl. ........................ 710/313; 710/306; 710/314; 713/322; 713/324

(58) Field of Classification Search .................. 710/306, 710/313, 314; 713/322, 324
See application file for complete search history.

(56) References Cited

U.S. PATENT DOCUMENTS

| 5,968,178 | A * | 10/1999 | Williams et al. ............. 713/340 |
| 6,085,325 | A * | 7/2000 | Jackson et al. .............. 713/300 |
| 6,219,736 | B1 * | 4/2001 | Klingman ................... 710/315 |
| 6,272,644 | B1 * | 8/2001 | Urade et al. ................. 713/320 |
| 6,665,801 | B1 * | 12/2003 | Weiss .......................... 713/300 |
| 7,032,120 | B2 * | 4/2006 | El-Kik et al. ............... 713/320 |
| 7,337,259 | B2 * | 2/2008 | Lee ............................. 710/305 |
| 7,337,338 | B2 * | 2/2008 | Chaiken et al. ............. 713/320 |
| 2005/0045726 | A1 * | 3/2005 | Terlizzi ....................... 235/454 |
| 2005/0246455 | A1 * | 11/2005 | Bhesania et al. ............. 710/10 |

FOREIGN PATENT DOCUMENTS

WO WO02/065264 8/2002

OTHER PUBLICATIONS

U.S. Appl. No. 11/370,384, filed Mar. 2006, Tetsuji.

* cited by examiner

*Primary Examiner*—Mark Rinehart
*Assistant Examiner*—Jeremy S Cerullo
(74) *Attorney, Agent, or Firm*—DLA Piper LLP (US)

(57) ABSTRACT

A communication control apparatus for common bus connection devices is provided between a plurality of devices to which addresses are allocated and a common bus and controlling an access between each of the plurality of devices and the common bus, the communication control apparatus includes: an input determination unit configured to recognize an identification signal indicating the beginning and end of a packet for the common bus which is an information unit capable of being transmitted by one transfer operation through the common bus and determining whether or not there is an input from the common bus to the device in question, a transmission determination unit configured to determine whether or not there is a transmission of the packet from the device in question on the common bus to the common bus, and an access suspend unit configured to determine that another device on the common bus is performing a packet operation and suspending a clock in each unit in the device in question when the input determination unit determines that the address of the packet inputted through the common bus from the other device is not destined for the device in question and when the transmission determination unit determines that there is not a transmission request for the packet from the device in question.

20 Claims, 5 Drawing Sheets

COMMUNICATION CONTROL APPARATUS FOR COMMON BUS CONNECTION DEVICES

CROSS REFERENCE TO RELATED APPLICATIONS

This application claims benefit of priority under 35 USC §119 to Japanese Patent Application No. 2005-171358 filed on Jun. 10, 2005, the entire contents of which are incorporated by reference.

BACKGROUND

1. Technical Field

The present application relates to a communication control apparatus, and in particular to a communication control apparatus for common bus connection devices such as a Universal Serial Bus (hereinafter USB) device used in a USB device controller or the like.

2. Related Art

Recently, data transmission lines for communication have been developed with progress of computer technologies and public communication networks such as the Internet. As an example, communication control apparatuses for Transmission Control Protocol (hereinafter TCP), Internet Protocol (hereinafter IP) and the like have been proposed and they are used in practice. Conventionally, USB has been proposed as a standard for common data transmission lines to connect a peripheral device such as a keyboard, mouse, modem, or joy stick to a personal computer.

USB as a common bus was initially introduced as USB 1.1 which is a standard for connecting devices that do not communicate so many amounts of data with a main unit. However, while development of IEEE 1394 has been delayed that was initially contemplated as a high-speed serial interface, USB 1.1 has seen explosive growth so that it has transferred to an interface also being capable of connecting with CD-R, HDD and the like. However, since USB 1.1 was a standard for transferring data only at maximum rate of 12 Mbps (=1.5 MB/s), USB 2.0 (HI-SPEED USB) standard has been developed in order to meet the need for high speed data transfer.

In the above USB standard, it is required to save power consumption of USB devices including an internal USB device controller, since there are bus power devices operating with power supply from a USB host device. Also in the USB standard, suspend mode is defined for saving power consumption of the entire system. This mode involves recognizing suspend (drive stop) if a packet communication from the USB host device to the USB device does not occur for 3 ms or more, and during the suspend period, the USB device controller can stop an internal clock or a clock itself being provided.

In the prior art described in National Publication of International Patent Application Lied-open No. 2001-506788, since the USB device controller performs power saving of itself and peripheral circuitry only during a suspend period of the USB standard, it is not achieved to save power consumption according to transfer states in normal transfer mode other than the suspend period.

In the conventional communication control apparatus for common bus connection devices described above, power saving of the control apparatus and the peripheral apparatus is performed only during for example the suspend period of the USB standard, therefore it is not achieved to save power consumption according to transfer states in normal transfer mode other than the suspend period.

SUMMARY

The communication control apparatus for common bus connection devices according to an aspect is provided between a plurality of devices to which addresses are allocated and a common bus and controlling an access between each of the plurality of devices and the common bus, the apparatus comprising: an input determination unit configured to recognize an identification signal indicating the beginning and end of a packet for the common bus which is an information unit capable of being transmitted by one transfer operation through the common bus and determining whether or not there is an input from the common bus to the device in question, a transmission determination unit configured to determine whether or not there is a transmission of the packet from the device in question on the common bus to the common bus, and an access suspend unit configured to determine that another device on the common bus is performing a packet operation and suspending a clock in each unit in the device in question when the input determination unit determines that the address of the packet inputted through the common bus from the other device is not destined for the device in question and when the transmission determination unit determines that there is not a transmission request for the packet from the device in question.

DETAILED DESCRIPTION OF THE EMBODIMENTS

Embodiments of a communication control apparatus for USB devices according to the present application will now be described in detail with reference to the accompanying drawings.

First Embodiment

Figure 1:
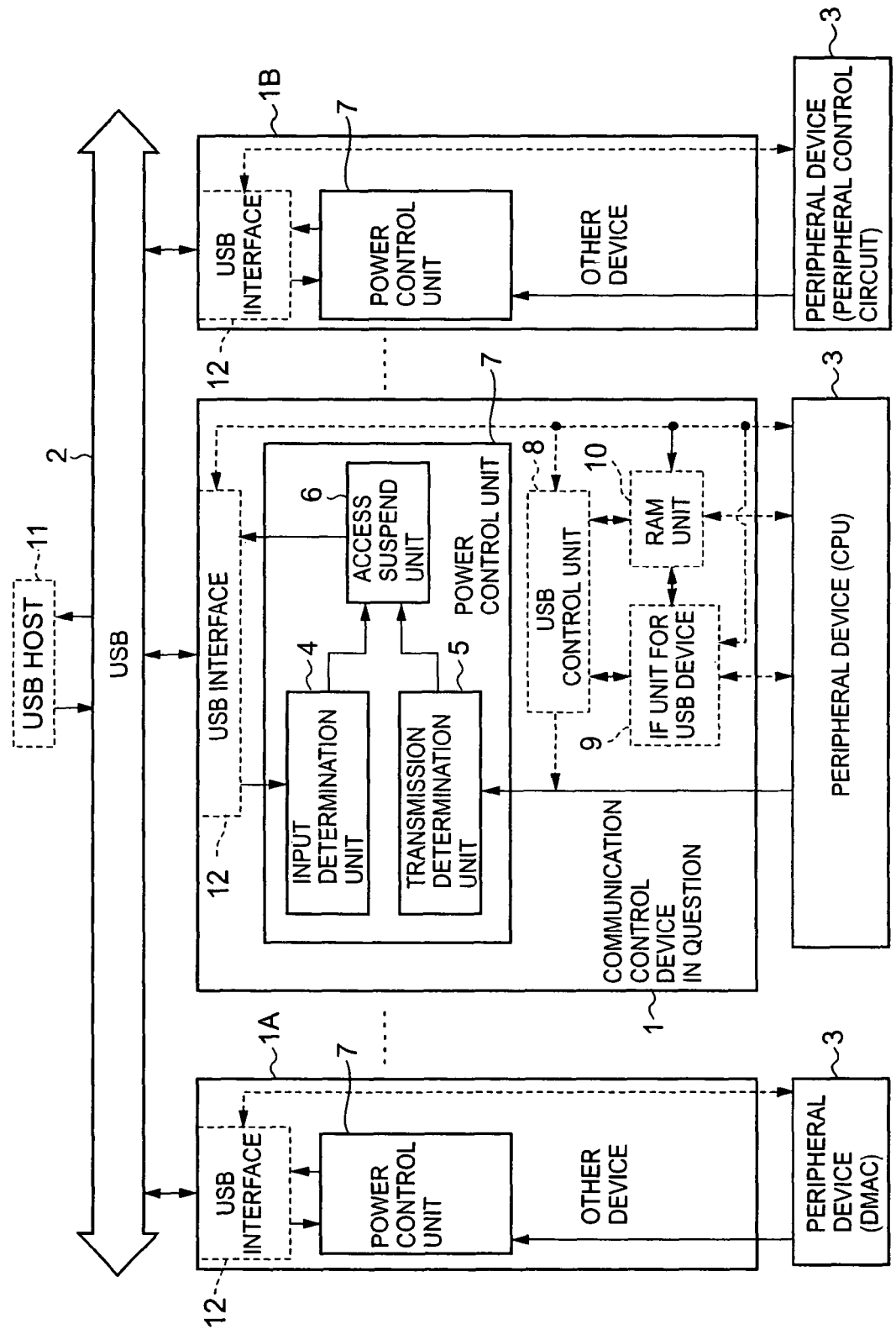
FIG. 1 is a block diagram showing a schematic configuration of a communication control apparatus according to a first embodiment.

With reference to FIG. 1, a communication control apparatus for USB devices according to a first embodiment will be described. In FIG. 1, the communication control apparatus 1 according to a first embodiment is provided between a USB 2 as a common bus and a peripheral device 3 as a USB device such as a Central Processing Unit (hereinafter CPU) or a Dynamic Memory Access Controller (hereinafter DMAC), and controls an access to the USB 2 from the peripheral device 3 as a USB device and an access to the peripheral device (peripheral control circuit) 3 from the USB 2. In FIG. 1, the device 1 in question and other devices 1A, 1B are shown as devices on the USB 2.

Also in FIG. 1, the communication control apparatus 1 for common bus connection devices is characterized by including an input determination unit 4 for recognizing an identification signal indicating the beginning and end of a USB packet which is an information unit capable of being transmitted by one transfer operation through the USB 2 as the common bus and determining whether or not there is an input from the USB, a transmission determination unit 5 for determining whether or not there is a transfer of the USB packet from the USB device 3 to the USB 2, and an access suspend unit 6 for suspending a clock in each unit in the device 1 in question in packet operation to the other devices 1A, 1B on the USB 2 when the input determination unit 4 determines that the address of the packet inputted through the USB 2 as the common bus from the other device 1A or 1B is not destined for the device 1 in question and when the transmission determination unit 5 determines that there is not a transmission request for the packet from the device 1 in question The input determination unit 4, the transmission determination unit 5 and the access suspend unit 6 constitute a power control unit 7 for controlling power saving of the communication control apparatus 1 and the peripheral circuitry 3. In addition to the power control unit 7, the communication control apparatus 1 for USB devices includes a USB control unit 8 for controlling major USB transfers, an interface (IF) unit 9 for USB devices which includes a register accessible to the peripheral device 3 and controls an access from the peripheral device 3, and a RAM (Random Access Memory) 10 for storing data for transferring between a USB host 11 connected to the USB 2 and the peripheral device 3. A USB interface 12 is provided between the USB 2 and the power control unit 7.

With the above configuration, the input determination unit 4 determines the address of an address signal as the identification signal of a USB packet outputted from the USB 2 and determines whether or not it is destined for the USB device 3 such as a CPU, and the transmission determination unit 5 determines whether or not there is an output data from the peripheral device 3 that is the USB device such as a CPU, and if the determination results from both of the input determination unit 4 and the transmission determination unit 5 are no-data, the access suspend unit 6 disables a clock of each block in the communication control apparatus 1 in question and saves the power consumption. In this way, extra power consumption is saved and power consumption of the entire system can be saved. Since the plurality of peripheral devices 3 are connected to the USB 2, power consumption can be saved for a clock in each block sequentially.

The input determination unit 4 may be composed of a SYNC/EOP determination unit configured to determine a synchronization portion (SYNC) attached to the beginning of a USB packet which is sent through the USB 2 as a common bus, and an end portion (EOP) attached to the end of the USB packet. The transmission determination unit 5 may be a USB control unit configured to determine that a packet is sent if there is an access of a packet for the common bus having transmission request from the peripheral circuit 3 as a common bus connection device for which the communication control apparatus is provided, and for performing normal control of transfer. Further, the access suspend unit 6 may be composed of a power control signal generating unit configured to generate a power control signal as well as turning off the power saving mode for the power control signal and disabling the clock in each part in the device 1 in question when a packet having the address of the peripheral device 3 as a common bus connection device for which the communication device 1 is provided is supplied from the USB 2 as a common bus as a result of the determination of the input determination unit 4 or when there is a transmission request from the device to another device. These particular configurations will be described in a second embodiment below.

Second Embodiment

Figure 2:
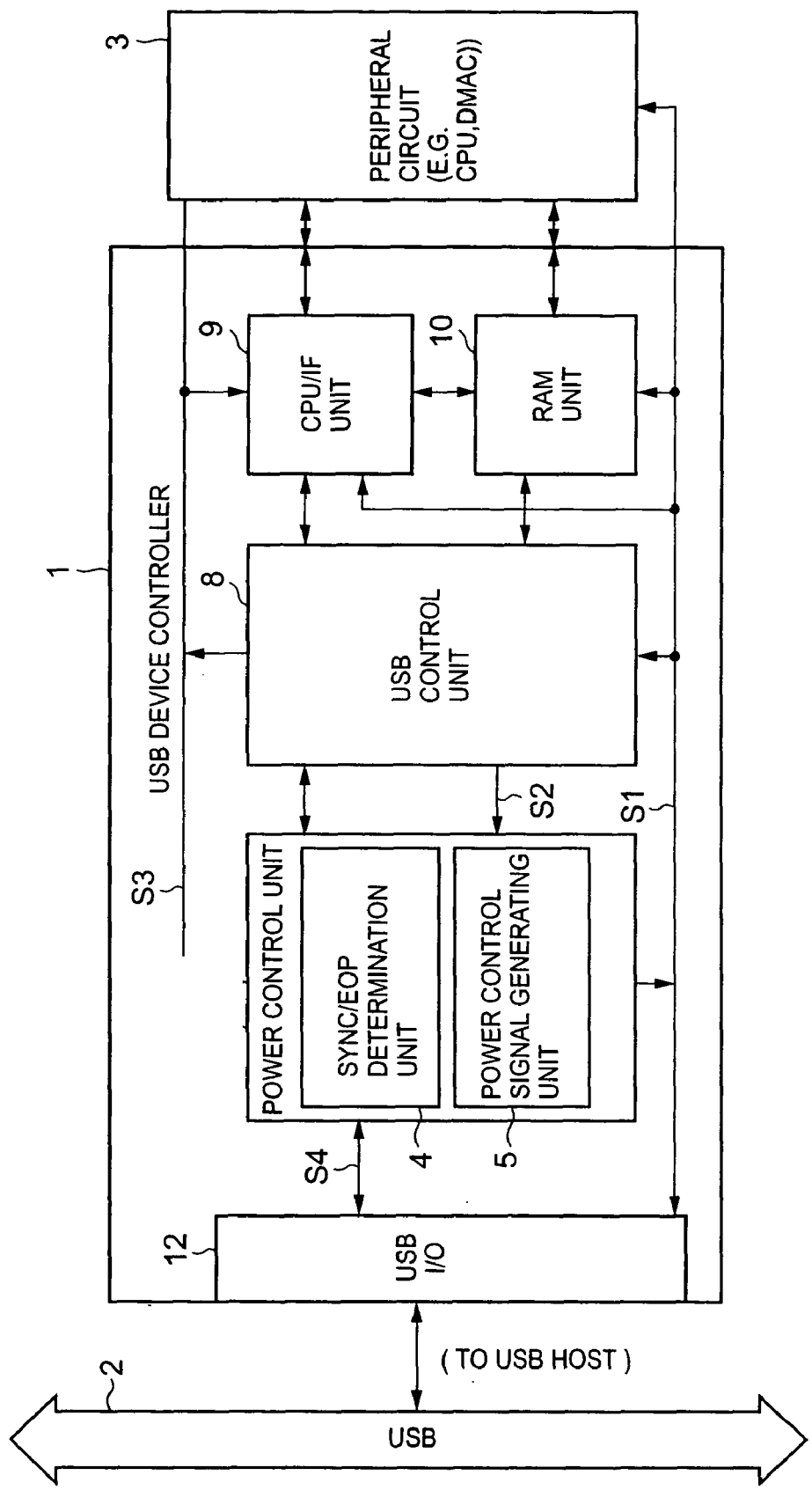
FIG. 2 is a block diagram showing a schematic configuration of a communication control apparatus according to a second embodiment.

A communication control apparatus for USB devices according to a second embodiment as an example of more particular configuration of the first embodiment in FIG. 1 will now be described with reference to FIG. 2. In FIG. 2, the same reference numerals as those in FIG. 1 refer to the same or corresponding components as the first embodiment.

In FIG. 2, a USB device controller (IP: Internet Protocol) 1 as a communication control apparatus for USB devices according to the second embodiment is connected to a USB 2 through a USB input/output (I/O) unit 12 and is also connected to a peripheral circuit 3 as a USB device such as a CPU, DMAC or printer. The controller 1 includes a power control unit 7 for controlling power saving in the controller and the peripheral circuit, a USB control unit 8 for controlling major USB transfers, a CPU/IF unit 9 which includes a register accessible to the peripheral circuit 3, here a CPU, and controls an access from it, and an internal RAM 10 for storing data for transferring between the USB host (not shown in FIG. 2) and the peripheral device 3.

Figure 3:
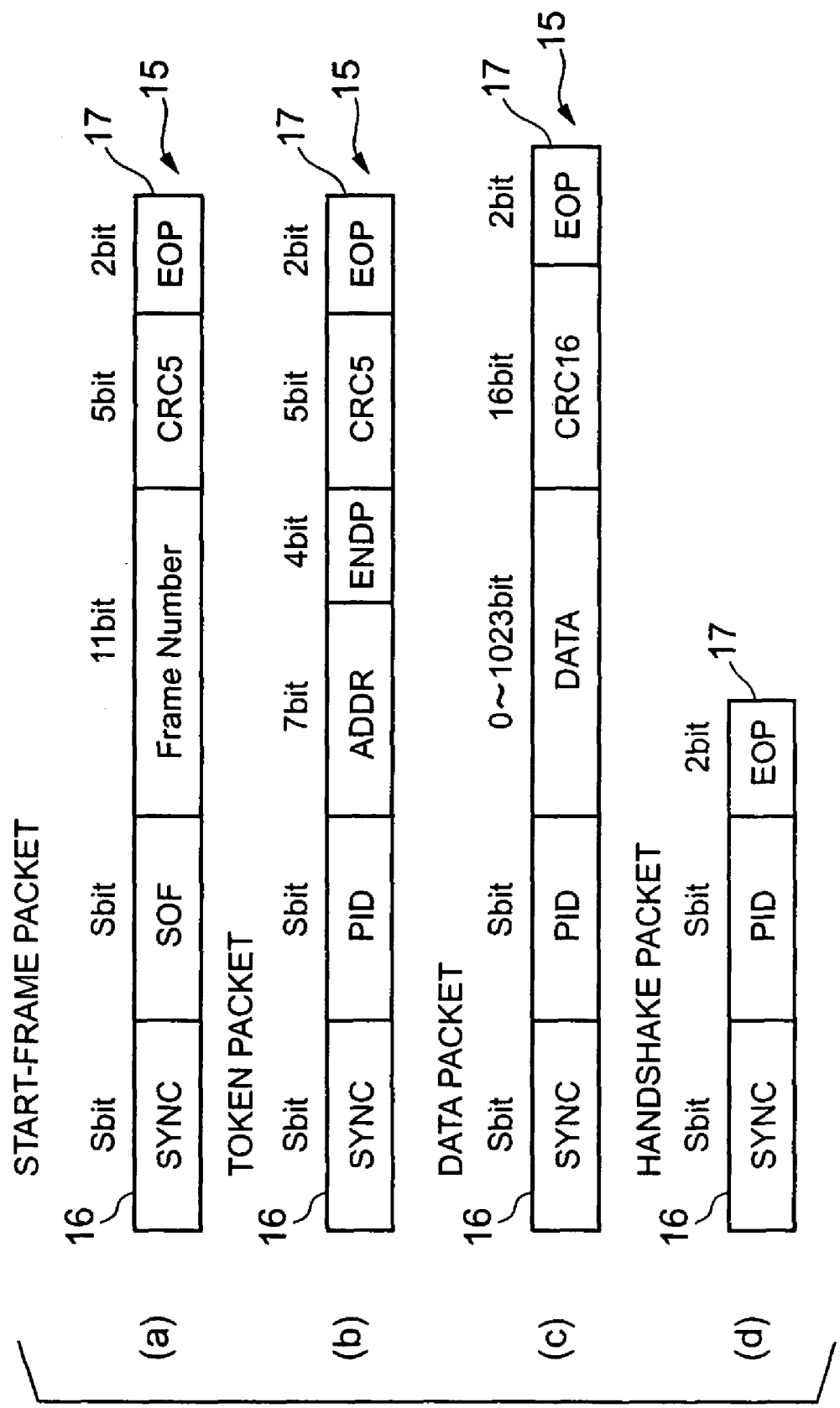
FIG. 3 describes examples of USB packet formats used in the second embodiment.

The power controls unit 7 includes a SYNC/EOP determination unit 4 for recognizing a SYNC (synchronous) signal 16 always appended to the beginning of the USB packet 15 for synchronization and an EOP (End Of Packet) signal 17 always appended to the end of the USB packet 15 as shown in FIG. 3, and a power control signal generating unit 5 for generating a power control signal to control power supply into the controller 1 and peripheral circuit based on signal information from the SYNC/EOP determination unit 4 and the USB control unit 8.

As illustrated in FIG. 2, the peripheral circuit 3 is a CPU, DMAC or other control circuits. The USB I/O 12 is an I/O circuit for USB and performs analog processing of a DP/DM signal.

An input/output signals to/from the power control unit 7 will be described. A power control signal S1 outputted from the power control unit 7 causes power supply to the USB control unit 8, CPU/IF unit 9 and RAM unit 10 to be stopped. More specifically, a gated clock causes a clock provided for each unit to be stopped, and the power saving modes for the peripheral circuit 3 external to the controller 1 and for the USB I/O 12 are enabled. The power control signal S1 can be controlled for each block of the peripheral circuit 3, USB control unit 8, CPU/IF unit 9, RAM unit 10 and USB I/O 12.

The USB control signal S2 is a control signal which is outputted from the USB control unit 8 to the power control unit 7 and controls the power control unit 7. A power control function selection signal S3 is a signal enabling to select ON/OFF of a power control function and it can be selected by both the USB control unit 8 in the controller 1 and the peripheral circuit 3 external to it. The selection signal S3 enables to select ON/OFF for each block of the USB control unit 8, CPU/IF unit 9, RAM unit 10, the peripheral circuit 3 and the USB I/O 12. If OFF is selected, the power control signal S1 to the block in question is always disabled and it is possible to operate normally. The USB input signal S4 is a DP signal, DM signal, DPDM operation input signal or the like received from a USB host through the USB I/O 12.

The operation of the communication control apparatus for USB devices according to the second embodiment having the above configuration will be described. During an idle state in which a packet is not transferred on the USB 2, the power control signal S1 is enabled by the power control signal generating unit 5 to provide power saving. When it is started to transfer a new packet in this state, the SYNC/EOP determination unit 4 determines the SYNC signal appended to the beginning of the packet and temporary disables the power control signal S1. Subsequently, if the address value of the packet matches that of a device controlled by the USB device controller 1, by continuing to disable the power control signal S1, the packet can be processed by the USB control unit 8. If not, the power control signal S1 is enabled again and power saving is provided.

Since the match/mismatch information of the address values is generated by a normal USB process, the information determined by the USB control unit 8 is sent to the power control signal generating unit 5 using the USB control signal S2. For start-frame packet not having an address value such as a SOF (Start Of Frame) packet, it is determined whether or not saving power consumption when the USB control unit 8 also determines whether or not it is a SOF, then the result of the determination is sent to the power control signal generating unit 5. A SOF packet typically follows a SYNC and is a type of PID (Packet ID) and a PID for a start-frame packet. As other types of packet, a Frame Number Field (FNF) for counting the number of fields and a CRC (Cyclic Redundancy Check) field for detecting transmission error are used, and the EOP (End Of Packet) is transmitted for each end of a packet.

Since the power control signal generating unit 5 can select a block for which the power control signal S1 is enabled, for example, even when power consumption is saved, only the RAM unit 10 or CPU IF unit 9 can operate to be accessed from the external peripheral circuit 3. Since ON/OFF of the power control function can be selected by the power control function selection signal S3, it can be performed at any timing.

Figure 4:
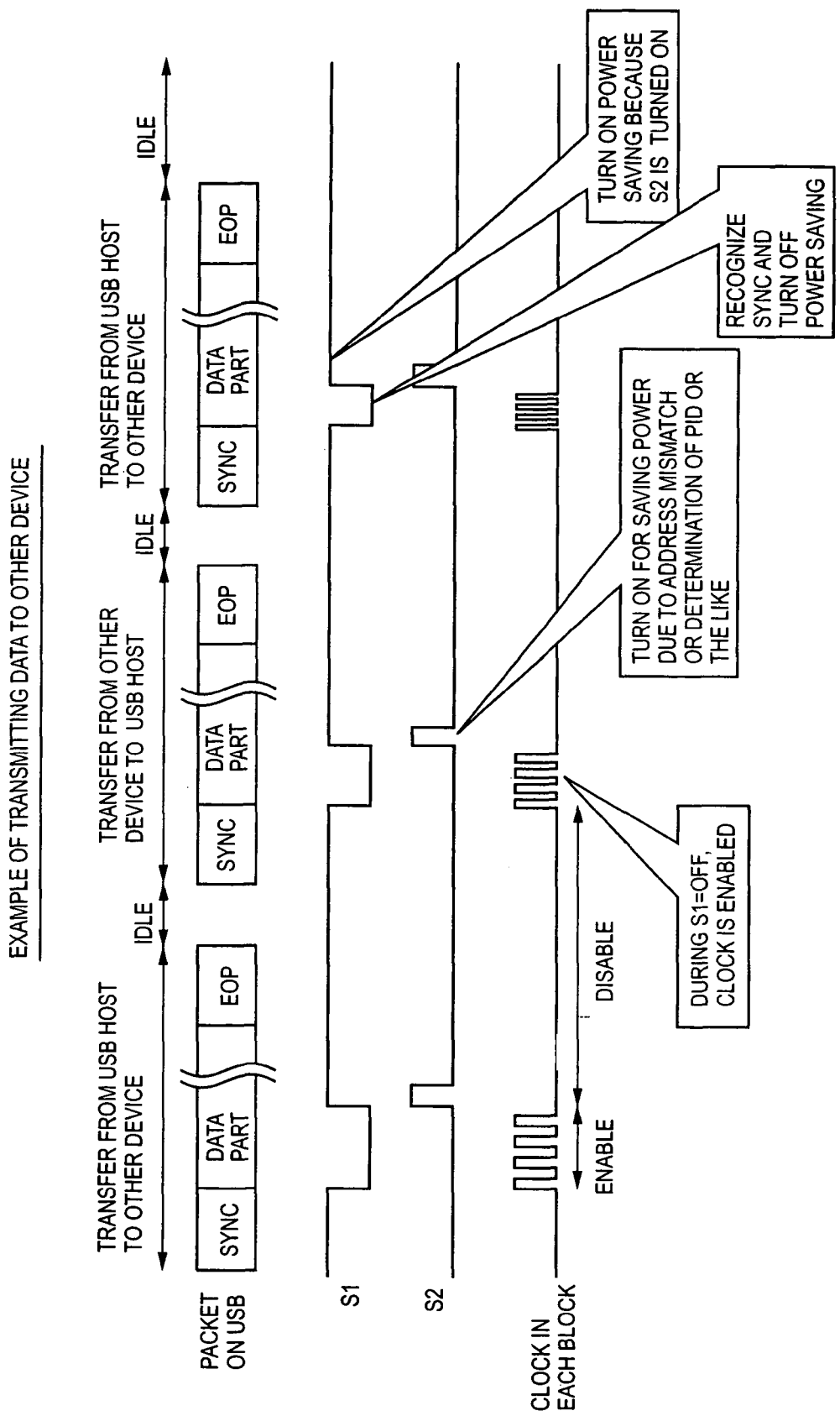
FIG. 4 is a timing chart describing an operation of the communication control apparatus according the second embodiment when another device is transmitting data.
Figure 5:
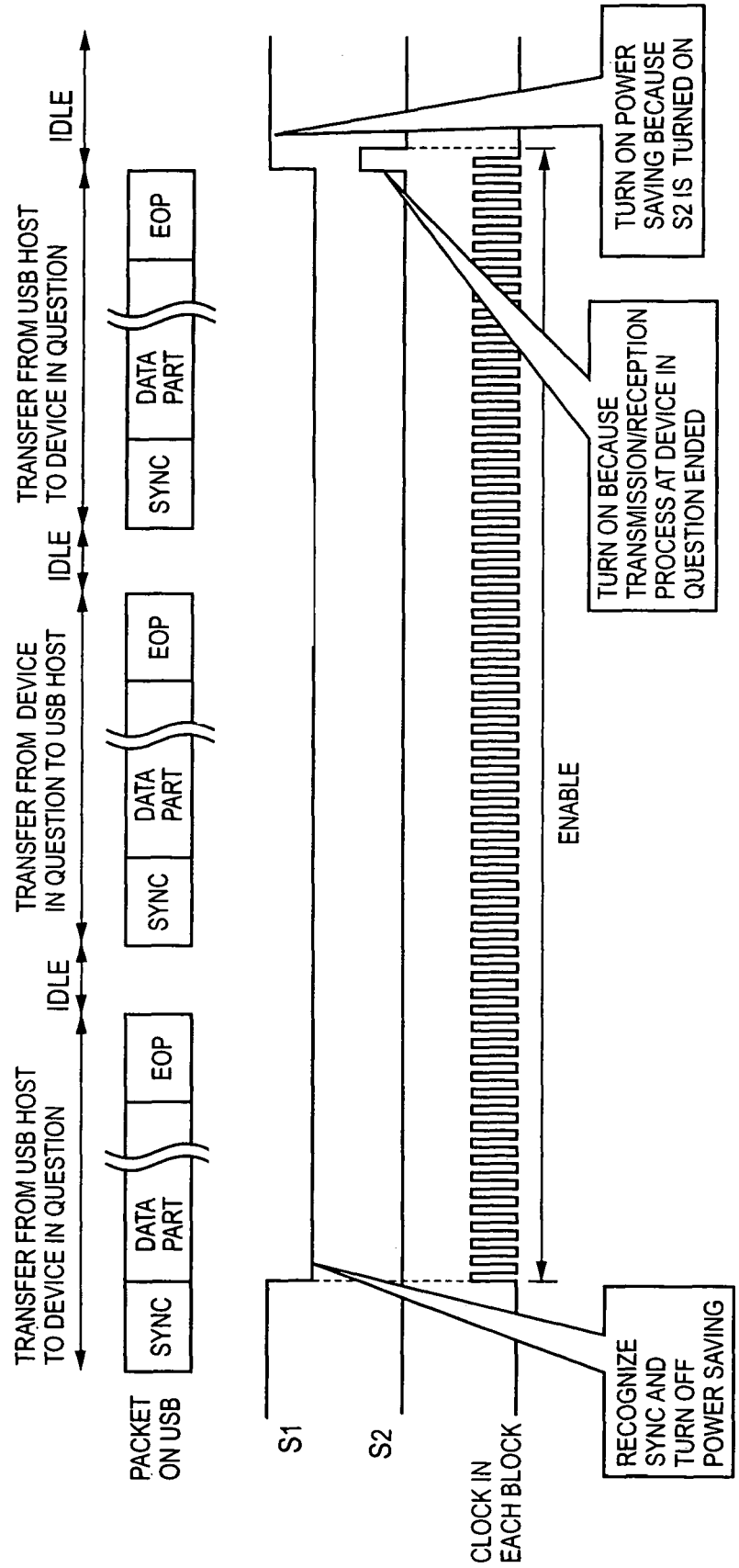
FIG. 5 is a timing chart describing an operation of the communication control apparatus according the second embodiment when data is transmitted to the device in question.

The operation of the USB device controller 1 shown in FIG. 2 will be described with reference to FIGS. 4 and 5 showing relationships among a packet on the USB 2, the power control signal S1, the USB control signal S2 and a clock signal in each unit. FIGS. 4 and 5 show timing charts showing timing of signals when sending data to another device and when sending data to the device in question, respectively.

First, as shown in FIG. 4, when data is sent to another device, the SYNC/EOP determination unit 4 determines a packet on the USB 2 and recognizes a SYNC in the packet, so that the power control signal S1 is turned off from the power saving mode at the timing of the end of SYNC. During the power control signal S1 is OFF, the clock in each block is in enabled state. Then the USB control signal S2 is turned on to save power consumption according to the determination of address mismatch, PID or the like. When the USB control signal S2 is turned on, the power control signal S1 is switched from power saving OFF to power saving ON and the clock in each block is switched from enabled state to disabled state. That is, when the USB control signal S2 is turned on, the power control signal is again turned on and power consumption is saved, and only when the power control signal S1 turns off the power saving by recognizing the SYNC in the packet, the clock in each block is enabled.

Next, as shown in FIG. 5, an operation when data is transmitted from another device to the device in question through the USB 2 will be described. The power control signal S1 initially causes the power saving to be ON. On recognizing the SYNC in a packet on the USB 2, it turns off the power saving, enables the clock in each block and continues to receive packets transmitted to the device in question. Next, when the transmission/reception process ends, the USB control signal S2 turns on so that the power control signal S1 is turned on for power saving. As a result, the clock in each block is disabled and the packet reception ends. Accordingly, when no packet is transmitted to the device in question, the communication control apparatus suspends the clocks in the device in question thus power saving being provided.

The above configurations and operations allow power saving of the controller itself in the device in question and power control of peripheral circuits according to packet communication states even in the normal transfer mode other than the suspend mode of USB.

What is claimed is:

1. The communication control apparatus for common bus connection devices provided between a plurality of devices to which addresses are allocated and a common bus and controlling an access between each of the plurality of devices and the common bus, the communication control apparatus comprising:
   an input determination unit configured to recognize an identification signal indicating the beginning and end of a packet for the common bus which is an information unit capable of being transmitted by one transfer operation through the common bus, thereby determining whether or not there is an input from the common bus to a first device;
   a transmission determination unit configured to determine whether or not there is a transmission of the packet from the first device on the common bus to the common bus; and
   an access suspend unit configured to determine that a second device on the common bus is performing a packet operation and suspending a clock in each unit in the first device when the input determination unit determines that the address of the packet inputted through the common bus from the second device is not destined for the first device and when the transmission determination unit determines that there is not a transmission request for the packet from the first device.

2. The communication control apparatus according to claim 1, wherein the input determination unit, the transmission determination unit and the access suspend unit constitute a power control unit configured to control power saving of the communication control apparatus and the peripheral circuitry by suspending the clock during a packet operation to the second device through a USB as the common bus when there is no packet supply or transmission between the USB and the first device.

3. The communication control apparatus according to claim 2, further comprising a USB interface for connecting the power control unit with the USB.

4. The communication control apparatus according to claim 2, further comprising a USB control unit configured to control major USB transfers, an interface (IF) unit for USB devices which includes a register accessible to a peripheral device and controls an access from a peripheral device, and a USB host being connected to the USB.

5. The communication control apparatus according to claim 4, wherein the power controls unit comprises a SYNC/EOP determination unit configured to recognize a SYNC (synchronous) signal always appended to the beginning of the USB packet for synchronization and an EOP (End Of Packet) signal always appended to the end of the USB packet, and a power control signal generating unit configured to generate a power control signal to control power supply into the controller and peripheral circuit based on signal information from the SYNC/EOP determination unit and the USB control unit.

6. The communication control apparatus according to claim 2, further comprising an RAM for storing data for transferring between a USB host connected to the USB and a peripheral device.

7. The communication control apparatus according to claim 1, wherein the input determination unit comprises a SYNC/EOP determination unit configured to determine a synchronization portion (SYNC) attached to the beginning of a USB packet which is sent through a USB as the common bus, and an end portion as an EOP attached to the end of the USB packet.

8. The communication control apparatus according to claim 7, wherein when starting to transfer a new packet in condition that the power control signal is enabled by the power control signal generating unit to provide power saving, the SYNC/EOP determination unit determines the SYNC signal appended to the beginning of the packet and temporary disables the power control signal, subsequently, when the address value of the packet matches that of a device controlled by a USB device controller, by continuing to disable the power control signal, the packet can be processed by a USB control unit.

9. The communication control apparatus according to claim 7, wherein, since the match/mismatch information of the address values is generated by a normal USB process, the information determined by the USB control unit is sent to the power control signal generating unit using the USB control signal.

10. The communication control apparatus according to claim 7, wherein, for start-frame packet not having an address value such as a SOF (Start Of Frame) packet, it is determined whether or not saving power consumption when the USB control unit also determines whether or not it is a SOF, then the result of the determination is sent to the power control signal generating unit.

11. The communication control apparatus according to claim 1, wherein the transmission determination unit comprises a USB control unit configured to determine that a packet is sent when there is an access of a packet for the common bus having transmission request from the peripheral circuit as a common bus connection device for which the communication control apparatus is provided, and for performing normal control of transfer.

12. The communication control apparatus according to claim 11 further comprising:
   a SYNC/EOP determination unit configured to recognize a SYNC (synchronous) signal appended to the beginning of the USB packet for synchronization and an EOP (End Of Packet) signal always appended to the end of the USB packet; and
   a power control signal generating unit configured to generate a power control signal to control power supply into the controller and peripheral circuit based on signal information from the SYNC/EOP determination unit and the USB control unit;
   wherein when starting to transfer a new packet in condition that the power control signal is enabled by the power control signal generating unit to provide power saving, the SYNC/EOP determination unit determines the SYNC signal appended to the beginning of the packet and temporary disables the power control signal, subsequently, when the address value of the packet matches that of a device controlled by a USB device controller, by continuing to disable the power control signal, the packet can be processed by the USB control unit.

13. The communication control apparatus according to claim 11, wherein, since the match/mismatch information of the address values is generated by a normal USB process, the information determined by the USB control unit is sent to the power control signal generating unit using the USB control signal.

14. The communication control apparatus according to claim 11, wherein, for start-frame packet not having an address value such as a SOF (Start Of Frame) packet, it is determined whether or not saving power consumption when the USB control unit also determines whether or not it is a SOF, then the result of the determination is sent to the power control signal generating unit.

15. The communication control apparatus according to claim 1, wherein the access suspend unit comprises a power control signal generating unit configured to generate a power control signal as well as turning off the power saving mode for the power control signal and disabling the clock in each part in the first device when a packet having the address of the peripheral device as a common bus connection device for which the communication device is provided is supplied from a USB as the common bus as a result of the determination of the input determination unit or when there is a transmission request from the device to the second device.

16. The communication control apparatus according to claim 15 further comprising a SYNC/EOP determination unit configured to recognize a SYNC (synchronous) signal appended to the beginning of the USB packet for synchronization and an EOP (End Of Packet) signal always appended to the end of the USB packet, wherein, for start-frame packet not having an address value such as a Start Of Frame packet, it is determined whether or not saving power consumption when the USB control unit also determines whether or not it is a Start of Frame, then the result of the determination is sent to the power control signal generating unit.

17. The communication control apparatus according to claim 15, wherein, since the match/mismatch information of the address values is generated by a normal USB process, the information determined by the USB control unit is sent to the power control signal generating unit using the USB control signal.

18. The communication control apparatus according to claim 15, wherein, for start-frame packet not having an address value such as a SOF (Start Of Frame) packet, it is determined whether or not saving power consumption when the USB control unit also determines whether or not it is a SOF, then the result of the determination is sent to the power control signal generating unit.

19. A communication control method of controlling common bus connection devices being provided between a plurality of devices to which addresses are allocated and a common bus and controlling an access between each of the plurality of devices and the common bus, the method comprising:
   determining whether or not there is an input from the common bus to a first device, after recognizing an identification signal indicating the beginning and end of a packet for the common bus which is an information unit capable of being transmitted by one transfer operation through the common bus;
   determining whether or not there is a transmission of the packet from the first device on the common bus to the common bus; and
   determining that a second device on the common bus is performing a packet operation and suspending a clock in each unit in the first device when the input determination unit determines that the address of the packet inputted through the common bus from the second device is not destined for the first device and when the transmission determination unit determines that there is not a transmission request for the packet from the first device.

20. The communication control method according to claim 19, wherein the input determination is performed by determining a SYNC/EOP of a synchronization portion (SYNC) attached to the beginning of a USB packet which is sent through a USB as the common bus, and determining an end portion as an EOP attached to the end of the USB packet.

* * * * *